US 12,508,573 B2

United States Patent
Raedts

(10) Patent No.: US 12,508,573 B2
(45) Date of Patent: Dec. 30, 2025

(54) CLEANING CHROMATOGRAPHY PACKED BED MATERIAL WITH THE AID OF A PROCESSING VESSEL, AND SAID VESSEL

(71) Applicants: JEMP HOLDING BV, BS Emmen (NL); Marcellus Johannes Hubertus Raedts, BS Emmen (NL)

(72) Inventor: Marcellus Johannes Hubertus Raedts, BS Emmen (NL)

(73) Assignee: JEMP HOLDING B.V., Emmen (NL)

(*) Notice: Subject to any disclaimer, the term of this patent is extended or adjusted under 35 U.S.C. 154(b) by 842 days.

(21) Appl. No.: 17/608,596

(22) PCT Filed: May 4, 2020

(86) PCT No.: PCT/NL2020/050283
§ 371 (c)(1),
(2) Date: Nov. 3, 2021

(87) PCT Pub. No.: WO2020/226490
PCT Pub. Date: Nov. 12, 2020

(65) Prior Publication Data
US 2022/0314201 A1    Oct. 6, 2022

(30) Foreign Application Priority Data
May 3, 2019  (NL) .................................... 2023070

(51) Int. Cl.
*B01J 20/34*  (2006.01)
*B01D 15/20*  (2006.01)
(Continued)

(52) U.S. Cl.
CPC ........ *B01J 20/3475* (2013.01); *B01D 15/203* (2013.01); *B01F 27/2312* (2022.01);
(Continued)

(58) Field of Classification Search
CPC .................................................. B01J 20/28047
See application file for complete search history.

(56) References Cited

U.S. PATENT DOCUMENTS 4,225,092 A    9/1980  Matter et al.
4,627,918 A   12/1986  Saxena
(Continued)

FOREIGN PATENT DOCUMENTS

EP    0 619 139    10/1994
EP    1 710 005    10/2006
(Continued)

OTHER PUBLICATIONS

International Search Report for PCT/NL2020/050283 dated Aug. 10, 2020, 4 pages.
(Continued)

*Primary Examiner* — Thuan D Dang
(74) *Attorney, Agent, or Firm* — NIXON & VANDERHYE

(57) ABSTRACT

Packed bed gel material cleaning vessel, has an internal processing volume, to contain the gel, delimited by a circumferential, axially extending, upright vessel wall at both axial ends sealed by a top vessel wall and an opposite bottom vessel wall, the internal processing volume is above 10 litre; sensors of the vessel monitor the filling level of the vessel. A bottom filter completely covers the vessel bottom wall A circumferential, axially extending, cylindrical vertical filter is provided a short radial distance, e.g. between 1 and 20 millimetre internally from, parallel and concentrically with, the upright vessel wall, providing a torus like flow gap concentrical with the upright vessel wall.

11 Claims, 5 Drawing Sheets

Figure 1:
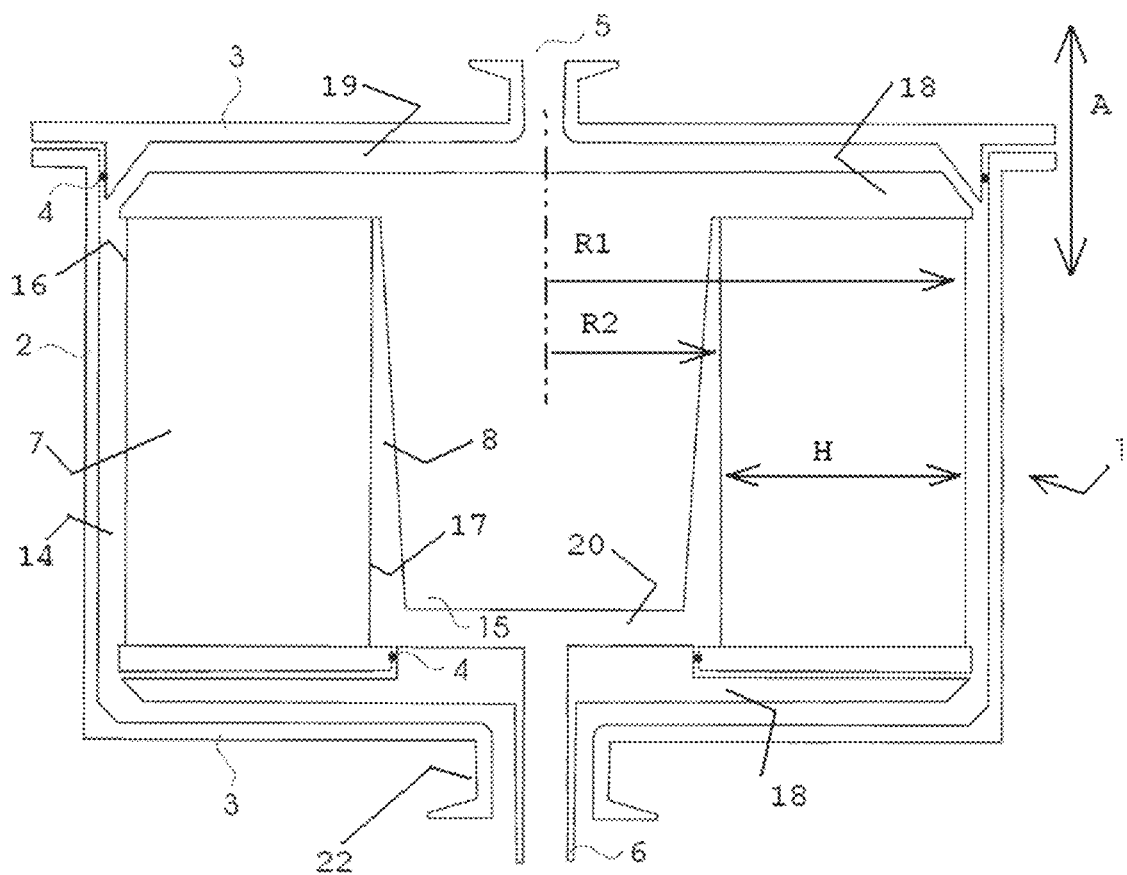

(51) Int. Cl.
*B01F 27/231* (2022.01)
*B01F 27/90* (2022.01)
*B01F 35/71* (2022.01)
*B01J 20/291* (2006.01)

(52) U.S. Cl.
CPC ............ *B01F 27/90* (2022.01); *B01F 35/712* (2022.01); *B01J 20/291* (2013.01)

(56) References Cited

U.S. PATENT DOCUMENTS

| | | |
|---|---|---|
| 4,676,898 A | 6/1987 | Saxena |
| 5,466,377 A | 11/1995 | Grandics et al. |
| 5,529,212 A * | 6/1996 | Terhardt .................. B29B 7/16 222/145.6 |
| 8,685,241 B1 | 4/2014 | Saxena et al. |
| 2013/0248430 A1 | 9/2013 | Gu |

FOREIGN PATENT DOCUMENTS

| | | |
|---|---|---|
| WO | 91/01796 | 2/1991 |
| WO | 03/059488 | 7/2003 |
| WO | 2007/136247 | 11/2007 |
| WO | 2012/040574 | 3/2012 |
| WO | 2014/092636 | 6/2014 |
| WO | 2019/143521 | 7/2019 |

OTHER PUBLICATIONS

Written Opinion of the ISA for PCT/NL2020/050283 dated Aug. 10, 2020, 8 pages.

* cited by examiner

CLEANING CHROMATOGRAPHY PACKED BED MATERIAL WITH THE AID OF A PROCESSING VESSEL, AND SAID VESSEL This application is the U.S. national phase of International Application No. PCT/NL2020/050283 filed May 4, 2020 which designated the U.S. and claims priority to NL Patent Application No. 2023070 filed May 3, 2019, the entire contents of each of which are hereby incorporated by reference.

The present invention relates to the field of capturing a product present in a process liquid using a column (e.g. radial flow type) for liquid chromatography comprising a packed bed of beads. In particular the invention relates to the field of downstream processing of biologics from cell culture or cell fermentation harvests.

General and specific background about chromatography and associated cleaning are provided by U.S. Pat. Nos. 4,627,918A, 4,676,898A, 5,466,377A, WO2014/092636, WO03059488, WO2007/136247 and WO2019/143251.

Liquid chromatography often uses a separation column. The separation column contains a stationary phase, i.e. packed bed or matrix medium or material (e.g. the "gel"), which interacts with the various components of the sample fluid to be separated. The composition of the separating medium (e.g. the gel) depends on the fluid being directed there through so as to produce the desired separation.

As used herein, the terms "horizontal or radial flow mode", which are used interchangeably, are defined as flow of the sample (e.g. biomolecules) or eluant or wash fluid through the chromatographic column in a direction that is perpendicular to the longitudinal axis of the column, regardless of the position of the column relative to the work bench or support stands or other equipment used to support or stack the columns.

During use, the performance of the packed bed, i.e. the e.g. gel of beads, is constantly deteriorating. Since the beads typically are extremely expensive (in the order of euro1-20/millilitre), at least for industrial application, the packed bed should be used-up completely. The same packed bed is preferably used many times (200 times being the practical limit) and cleaned thoroughly before each next time (i.e. between each two successive uses). Despite all care, the theoretical maximum number of uses is hardly matched in case of use that covers a period of many months (say 6 or 12 months), due to aging. Aging is aggravated due to the inevitable inability of complete removal of any possible contamination during cleaning between two subsequent uses.

BACKGROUND SPECIFIC TO THE PRESENT INVENTION

The material for the packed bed is e.g. called "adsorbent" or "gel" or "resin" in here. The beads of the gel can be small or large in diameter, e.g. beads having a diameter between 10 and 1100 micrometre (0.01-1.1 millimetre), e.g. having a diameter of 20-100 or 100-300 or 300-500 or 500-800 or 800-1100 micrometre (equals 0.02-0.1 or 0.1-0.3 or 0.3-0.5 or 0.5-0.8 or 0.8-1.1 millimetre, respectively).

The invention is particularly directed to a process of cleaning the material for the packed bed by using a preparation vessel (also abbreviated by "vessel") to process the material for the packed bed (i.e. the "gel"); and to such vessel.

This adsorbent/gel/resin preparation vessel is meant to facilitate and automate the execution of a number of gel related processing steps, mainly but not exclusively in conjunction with preparation/cleaning/activation/collection to waste/adsorption or desorption. This vessel has an internal processing volume, to contain the gel. This internal processing volume is delimited by a circumferential, axially extending, e.g. cylindrical, vessel wall (during normal operation of the vessel the axially upward or vertical extending vessel wall), at both axial ends closed or sealed by a top vessel wall and an opposite bottom vessel wall (during normal operation of the vessel the horizontally extending top or upper and bottom or lower vessel wall, respectively). The internal processing volume is preferably between 10 and 1000 or 5000 litre. Extraction of material from an vessel internal volume is preferably by gravity action only and/or pump suction.

Typically, before a new gel is used for packed bed column chromatography, the storage solution of the gel needs to be replaced by a suitable liquid (buffer), this is called a buffer exchange; also decanting, de-fining and concentration adjustment can be required prior to packing of packed bed chromatography columns.

After use, gel is e.g. taken off-line (unpacked) to be washed, treated, cleaned etc., thus is processed, to make it ready for re-use.

Before or after use, concentrated collection into a storage bin is a common topic.

Change of the functionality by interaction with the surface chemistry of the gel activation/modification will sometimes be required prior to an application.

The used gel is transferred into the preparation vessel, process liquid is added and the gel is free flowing in a mixed state (similar to a slurry) of suitable density. The vessel can be cylindrical, square or any other shape. The vessel is equipped with a number of attributes to facilitate the targeted tasks namely one or more of:

The vessel is equipped with a bottom filter ("filter" is also named "filtering wall" or "sieve" or "frit"), preferably plate like and/or in the shape of a funnel or reversed dome, having its lowest point at the axial centre of the vessel (or: the centre of the vessel bottom wall, seen in top view). This bottom filter preferably comprises a laminate of at least two or three layers and/or is spaced from the bottom wall of the vessel. This bottom filter is located above and/or for at least 80% or 90% or completely covers the vessel bottom wall and/or the area enclosed by the vessel circumferential wall, e.g. is sealed to the vessel circumferential wall along its complete circumference or provided in an alternative manner such that liquid internal of the vessel and at the side of the bottom filter facing the vessel top wall can only enter the space internal of the vessel at the opposite side of the bottom filter by passing the bottom filter.

The bottom filter surface facing the internal of the vessel (i.e. the top face or upward directed face during normal operation of the vessel) is such that the gel cannot enter the cavities of the bottom filter, i.e. the filter surface porosity is smaller than the bead size of the gel. This provides that the beads of the gel will always stay on top of the filter surface. The bottom filter is designed such that the beads stay on top of the bottom filter and can not sink into the top face of the bottom filter.

Under the bottom filter, the internal vessel liquid that has passed the bottom filter is collected internally of the vessel above the vessel bottom wall and below the bottom filter (in other words: in the space between the vessel bottom wall and the bottom filter), preferably by gravity action, preferably such that the resistance of flow is such that with a relative density of 1 (water), gravity will suffice to drain vessel internal liquid through the bottom filter.

The vessel lower internal storage volume below the bottom filter, for fluid that has passed the bottom filter from the vessel upper internal storage volume above the bottom filter, is kept small, preferably below 5 litre per square meter filter surface. The vessel internal processing volume (mentioned above) equals at least the vessel lower plus upper internal storage volume. The spacing between the bottom filter and the vessel bottom wall is preferably between 1 and 5 or 10 millimetre.

a separate bottom particle draining port is present, preferably in the axial centre of said bottom filter and/or at the lowest point of the vessel bottom wall, that will allow draining of the vessel upper internal storage volume (that e.g. contains the gel that is unable to pass the bottom filter) from the vessel to the outside, preferably through a vessel wall, e.g. the vessel bottom wall. This bottom particle draining port is sealed from the space between the bottom filter and the vessel bottom wall (i.e. the vessel lower internal storage space) and is in fluid communication with the internal vessel volume (i.e. the vessel upper internal storage space) above the bottom filter, via a draining pipe sealingly penetrating the bottom filter and the vessel bottom wall. During the processing of the gel, liquid is supplied to the vessel upper internal storage space via this bottom particle draining port.

The external access to and from the area below the bottom filter (i.e. the vessel lower internal storage space) is provided by a bottom draining port and is sealed from the external access to and from the vessel upper internal storage space via the bottom particle draining port. Thus liquid free of particles and thus able to pass the bottom filter can be extracted from or added to the vessel upper internal storage space, into respectively from the vessel lower internal storage space via the bottom filter and the bottom draining port while independent or simultaneously, particulate matter (i.e. gel) can be extracted from or added to the vessel upper internal storage space via the bottom particle draining port. This setup allows a small sized vessel.

The gel content of the vessel can be concentrated by removing filtered liquid via the bottom filter. Alternatively, draining of liquid through the bottom filter and the bottom draining port can be done while simultaneously liquid or particulates (e.g. beads) or both are added from one of the other access-ports of the vessel that are preferably located remote from the vessel bottom wall, e.g. at or near the vessel top wall. In other words, simultaneously offering the possibility of draining while filling, or vice versa.

floating bed draining: liquid can be added to the vessel upper internal storage space via the bottom filter and the bottom draining port, so flowing from the bottom draining port in the bottom "up" through the bottom filter into the vessel upper internal storage space. This results in a local dilution of the liquid just above the bottom filter (in other words at the interface between the bottom filter and the vessel upper internal storage space). When particulate matter (i.e. gel) is in the vessel upper internal storage space this results into a film of pure liquid (i.e. liquid poor of or devoid from particles) just above the surface of the bottom filter.

When the bottom particle draining port is opened while liquid is added "up" via the bottom filter (i.e. "floating bed draining"), the floating bed created causes the gel to easily flow into the bottom particle draining port. The result is draining of the gel in a more concentrated form without leaving particulate residue behind on the upper surface of the bottom filter facing the vessel top wall.

Highly concentrated draining is beneficial when the particles need to be incinerated or stored elsewhere (e.g. due to a smaller volume of the highly concentrated gel).

The vessel bottom wall and the vertical (also named "upright" or "circumferential") vessel wall are separable, preferably by a flange construction or equivalent means that are repeatedly connectable and disconnectable without permanent deformation or damage.

The outer circumference of the bottom filter is sandwiched between the vessel bottom wall and the vertical vessel wall or flanges of it.

A vertical filter is provided a short radial distance from, and preferably concentrically with, the vertical wall of the vessel, preferably plate like and/or sealed to another element of the vessel, e.g. the bottom filter and/or the vessel bottom wall and the vessel upright wall at its lower and upper, respectively, edges; and/or extends at least 50% or 80% the height of the upright vessel wall and/or completely circumferentially.

The vertical filter is provided such that the volume (i.e. the "dead volume") delimited between the vertical wall and the vertical filter is less than 10 or 20 litre per square meter and/or the spacing between the vertical filter and the vertical wall is between 1 or 5 and 10 or 20 or 30 millimetre.

The top edge of this vertical filter is above the maximum fill level (for the gel) of the vessel.

The bottom edge of the vertical filter is close or at the flange separating the vessel bottom wall from the upright walls of the vessel, keeping the "dead volume" small that stays behind during draining, despite gravity force.

at the lowest point of the vertical filter a liquid collection channel is present, extending the complete radial (also called "horizontal" circumference of the vessel and provided by a radial outward extension of the vertical wall such that at that location the spacing between the vertical filter and the vertical wall is increased at least 30% and which channel provides a local expansion of said spacing.

A vertical filter draining port in the external wall of the vessel, preferably close to or at the lowest point of the vertical filter will act as fluid access to the vessel internal volume between the vertical filter and the vertical wall. This port is for draining and feeding (particle-free) liquid.

a mixer is installed, axially of the vessel, e.g. equipped with blades near and above the vessel bottom filter, or designed in an equivalent manner to gently but efficiently homogenize the content of the vessel upper internal storage space by mixing action.

Alternatively, this mixer can be integrated in the bottom of the vessel, preferably in a position outside the centre and/or not at the lowest point of the vessel.

The by the mixer provided velocity/energy of the mixing can be adjusted to adapt to the mechanical robustness of the gel.

The vessel top wall is equipped with ports that grant access to the internal of the vessel from the outside. Ports are executed as a tubeconnection) and as a handway.

A number of those ports are positioned in the top of the vessel above the anticipated "working-volume" or fill level, e.g. in the vessel top wall.

Some of those ports are positioned below the anticipated "working volume" or fill level.

one of the access ports, in the form of a tube, is provided to deliver its liquid from above against the shaft of the mixer at an angle between 25 and 65 degrees, e.g. about 45 degrees relative to the vertical (i.e. the vessel axial direction), debouching just above the gel within the vessel upper internal storage space. The shaft of the mixer will then act as a guide for the liquid further down into the gel.

for the vertical filter and/or the bottom filter one or more of the following applies: made from stainless steel, preferably sintered, or made from plastic or polymer material; granulate, printed (i.e. by 3D printing) or woven; electro polished surface; hydrophilic surface; comprising at least or exactly one or two or three or four layers or sheets ("layer" and "sheet" have identical meaning) of woven wires of e.g. stainless steel, directly laid on top of each other, at least one of the sheets, e.g. the sheet providing the (during normal operation of the vessel) top face or upward or inward facing face of the filter, preferably, e.g. when woven, with a fine and/or well defined porosity, preferably woven according to a plain weave or twilled weave or plain dutch weave or twilled dutch weave or reversed plain dutch weave or reversed twilled dutch weave or five-peddle weave pattern; the sheets provide a united assembly, preferably are mutually sintered (also called diffusion bonded); each, sheet is woven from wires having a diameter at least 10% or 20% different, e.g. larger or smaller, from the immediately adjacent sheet; the wire thickness among sheets increases from the one to the other face of the filter, preferably from the (during normal operation of the vessel) top face or upward or inward facing face; the wire thickness of the sheets is at least 25 or 50 micrometre (equals 0.025 and 0.05 millimetre) and/or not more than 500 micrometre (equals 0.5 millimetre); at least one or two, e.g. each, sheet has a pore size at least 10% or 20% different, e.g. larger or smaller, from the immediately adjacent sheet; the pore size among sheets increases from the one to the other face of the filter, preferably from the (during normal operation of the vessel) top face or upward or inward facing face; the sheet, e.g. reinforcement sheet, having the thickest wires and/or largest pore size, e.g. at least 500 micrometre (0.5 millimetre) is the, preferably ultimate, inner- or outermost sheet of the filter, preferably the sheet the most remote from the (during normal operation of the vessel) top face or upward or inward facing face; thickness at least 0.3 or 0.8 or 1.0 millimetre and/or not more than 1.2 or 1.5 or 1.8 or 3.5 millimetre; pore size (this is the "nominal" pore size, defined by the diameter of the largest or smallest rigid sphere that can pass the pore) at least 1 or 10 or 50 or 100 and/or not more than 100 or 200 or 500 micrometre (equals 0.001, 0.01, 0.05, 0.1, 0.2 and 0.5, respectively, millimetre); contains a single filter layer; a filter layer is directly exposed to the contents of the vessel, i.e. the gel; at the side of the filter layer facing upward or inward (during normal operation of the vessel), a layer, e.g. protective layer, is absent; a filter layer provides the surface layer; has at the one side of a filter layer no layer or merely a protective layer and at the other side merely a protective or dispersion layer and possibly exactly one or two further layers, preferably reinforcing layers; provides a filtering wall or filtering membrane, preferably having and/or covering a surface area at least 25 or 50 or 75 or 90% the surface area of the adjacent external wall of the vessel (i.e. in case of the vertical filter the circumferential, axially extending vessel wall and in case of the bottom filter the bottom vessel wall) and/or at least 500 or 1000 or 2000 square centimetre; acts like a sieve; has an outstretched shape, e.g. like a container wall; is non-corrugated and/or non-folded; is expanded.

The vertical filter surface facing the internal of the vessel (i.e. the inward directed face during normal operation of the vessel) is such that the gel cannot enter the cavities of the vertical filter, i.e. the filter surface porosity is smaller than the bead size of the gel. This provides that the beads of the gel will always stay on top of the filter surface. The vertical filter is designed such that the beads stay on top of the vertical filter and can not sink into the top face of the vertical filter.

One of the benefits of the vessel is that after draining, the gel within the drained vessel is "dry".

When a gel is concentrated by draining liquid out of the vessel via the filter, increasing resistance by the layering of particulate matter onto the filter will restrict the draining flow rate. Even while homogenizing the slurry by mixing, the direction of flow in the direction of the filter will cause the creation of a layer of particles on top of the filter. This layering is proportional to the superficial velocity (cm/h) through the filter, inversely proportional with mixing energy and is amplified by force of gravity. Only when the relative density of the particles in the slurry is equal to the density of the liquid, gravity will not contribute to the layering. It is known that even at gentle mixing, without any contribution of gravity, a superficial velocity of more than about 5 cm/h through the filter will be enough to start the layering of a soft gel. With gravity this velocity is less. In other words, about 500 litre per hour per $m^2$ will cause a slow buildup of resistance and reduce the flow.

The advantage of a vertical filter is 2-fold:

1. In a vessel with normal dimensions, the surface area of the vertical filter is typically larger, e.g. at least three or four times larger, than the bottom filter, allowing the flow velocity towards the surface of filter to be proportionally lower (e.g. at least three or four times lower) at the same volumetric flow rate and/or a higher volumetric flow rate can be applied without restriction of flow by the layering of the particles against the filter;

2. Since gravity is perpendicular to the flow of liquid in a vertical filter, gravity settling of a particle more dense than the surrounding liquid, as is mostly the case, will not accelerate the building of the layering against the vertical filter such that flow is restricted when the slurry is being concentrated.

Hence the exchange of liquid in such vessel can be much faster as compared to a vessel with only a bottom filter. By combining vertical and bottom filters the multidimensional filtration will allow fastest liquid exchange while offering the aforementioned attributes of the bottom filter in concentrated collection of gel.

For the administration of liquids, solids, vapors and gasses to the vessel, several ports can be installed at different positions of the vessel. The vessel is preferably equipped with means CIP (Clean In Place) devices to efficiently, automatically and completely clean the internal volume and accessories, after, prior or during use. For the removal of liquid and/or gel, filters that separates solids from liquid, multiple draining and liquid/gas or vapour extraction port-assemblies are preferably available. All ports can be closed automatically or manually. An optional, mostly in the centre and lowest positioned port will allow draining of the complete content including gel, liquid, vapour or gas individually or as a mixture. To facilitate this draining process the bottom can is shaped conical with a slope of 0 to degrees or shaped as a reversed dome.

The multiple layered filter, separating the particulate matter from the non-particulate liquid is preferably completely covering the bottom, except for the area of the draining port that will allow particulate draining, the wall, except the part above the working volume, is preferably asymmetrical, meaning the porosity of the layer facing the internal of the vessel has a porosity smaller than the smallest particle to be separated. The additional layers are meant for physical support and have a larger porosity.

Figure 13:
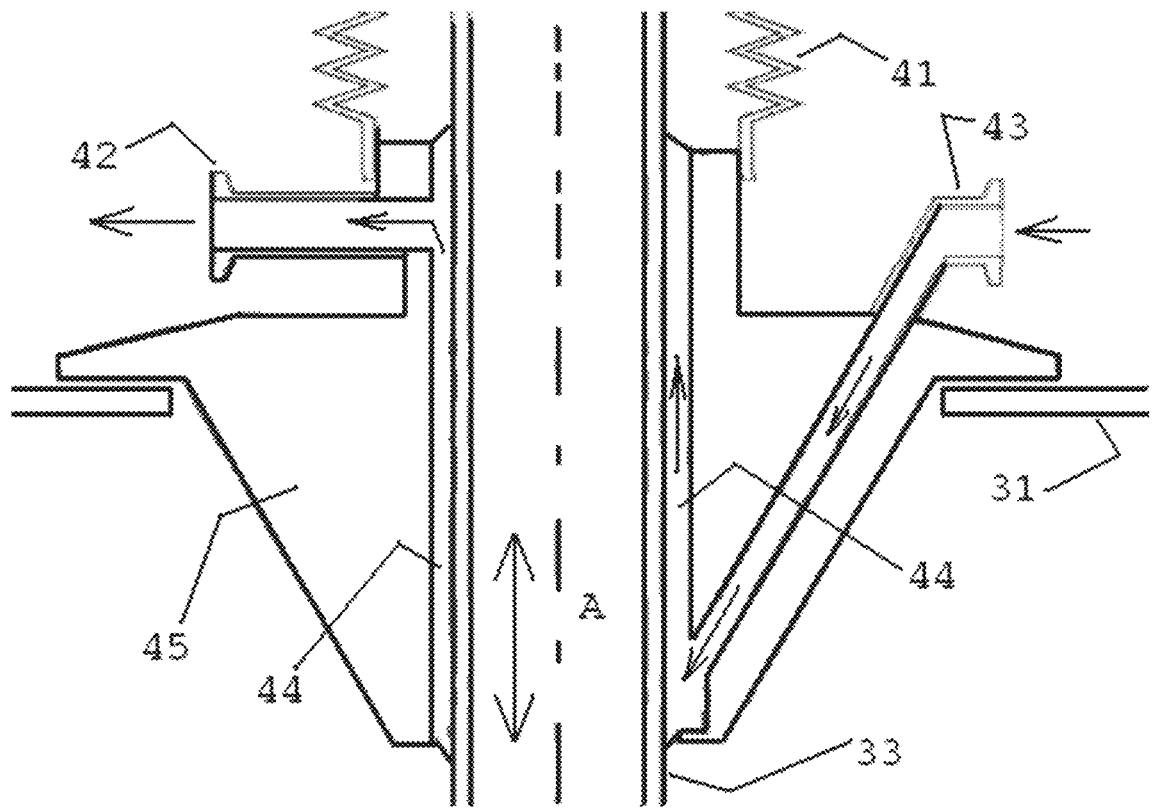

The (holdup-) volume under the bottom filter is preferably kept to a minimum to allow liquid entry or draining with minimal excess. Since the bottom shape is conical, channels (viz. FIG. 13) are preferably present to collect and distribute the liquid efficiently, allowing the filter to rest on the main bottom surface for minimal holdup volume, preferably less than litre per square metre filter surface. The filter allows swift liquid draining from, but also liquid administration into the vessel. Distribution channels are preferably designed proportionally to the velocity and volume of liquid that needs to be drained or administered such that it will result in an even distribution of the liquid over the whole surface of the filter. The vertical filter is preferably installed equidistant from the wall of the vessel, leaving a gap between the filter and the vertical wall(s) of the vessel with a volume of preferably less than 10 litre per square filter surface, increasing the filter surface area by three to four times. In this execution liquid can individually or simultaneously be drained or administered through/from the bottom and the complete circumference of the vessel. The main benefit of increasing the surface area of the filter is to increase the liquid-draining velocity and therefore increase process efficiency. Despite active mixing, particulate matter will, driven by the flow in the direction of the filter, layer itself onto this filter. In case of a bottom filter gravity will add to this layering effect. During the draining process, the increasing thickness of this particulate layer on top of the filter will cause an increase in resistance to flow, hence reduction of the maximum flow rate during the draining process. The flow rate in the direction of the filter being responsible for layering of the particulate matter onto the filter and can be expressed as linear- or superficial velocity often dimensioned in (cm/h) or (m3·s·1·m·2). The relative density of the particle in the liquid will result in a certain behaviour of those particles in the suspension they are in. Is the particle heavier, a relative density substantially above 1, it will have a tendency to settle onto the bottom sieve by gravity. Dependent on mechanical constraints, more vigorous mixing could help to keep the particles from layering onto the bottom sieve but at the expense of a risk of mechanical damage. Alternatively, the vertical sieve is used, gravity being perpendicular to the direction of flow at the vertical sieve will prevent layering by gravity. Gels that in watery systems often have a density close to 1 (between 1,1 and 1,3) will easily be carried with the direction of flow. When the particles are fragile, which often is the case, relative mild mixing will apply. In these cases, the filter surface area needs to be maximized to allow reduction the directional flow towards the sieve. Typical a filter directed velocity of less than 5 cm/h will preserve a suspension with limited layering in combination with mild mixing.

The flow in the direction if the filter is proportionally to the surface area of the filters. By the increase in surface area and the reduction of directed flow, the layering process will be reduced or even completely absent at increasing available surface area. Hence the draining process can be 3× to 4× faster proportional to the added surface area of the filter.

The vessel is preferably an assembly of a number of separable subunits and is preferably mounted on a frame that can offer an array of functions, uniquely or in combination. Primarily the frame is meant to support the vessel assembly and should offer a sturdy base, featuring height adjustable feet or optionally it can be executed with freely rotating castors to freely move the vessel. Sensors are preferably installed to assess and monitor the filling level of the vessel, depending on the most effective match with the type of application and/or execution, sensors can act by differential weight, differential static pressure or actual liquid level height monitoring. Hence the liquid handling processes can be completely automated or controlled by an operator.

Alternatively or additionally, to enhance the operation of the vessel, the vessel inlet tube is improved.

The vessel inlet tube is located at high level, e.g. vertically remote from the vessel bottom plate and/or near the vessel top plate and/or projecting through the vessel top plate. The vessel inlet tube extends from outside the vessel into the vessel and is outside the vessel attached to a supply of liquid, e.g. a liquid container. The nozzle (e.g. provided by the relevant longitudinal end of the inlet tube) of the vessel inlet tube is located inside the vessel. The nozzle and/or the inlet tube longitudinal end part that carries the nozzle has an inclination, e.g. at least 20 or 30 and/or not more than 40 or of 45 degrees relative to the vertical. The nozzle is directed towards and faces the drive shaft of the mixer and is located spaced from the drive shaft, e.g. for at least 5 and/or not more than 50 millimetre. Thus, the nozzle ejects the supplied liquid against the vertically oriented drive shaft inside the vessel.

The vessel inlet tube has an internal diameter e.g. at least 5 or 10 or 15 and/or less than 75 or 100 millimetre. The flow of liquid through the vessel inlet tube is e.g. at least and/or less than 1000 or 1500 or 2000 litre/hour.

The drive shaft is part of the mixer and carries at low level mixing blades (also called "vanes"). The drive shaft is preferably located at the axial centre. Preferably, the upper longitudinal end of the drive shaft is outside the vessel and/or attached to a drive means, e.g. electric motor, to bring the drive shaft, and thus the associated mixing blades, in rotation to stir the liquid inside the vessel.

Alternatively or additionally, to enhance the operation of the vessel, the vessel bottom wall is improved. The vessel bottom wall, preferably in the shape of a funnel or reversed dome, having its lowest point at the axial centre of the vessel (or: the centre of the vessel bottom wall, seen in top view) and the central outlet port (alternatively provided as inlet port) is located at the axial centre and crosses the bottom plate.

The internal vessel bottom wall (also called in here: bottom plate) has an inventive pattern of grooves in the top face (i.e. the to the inner space of the vessel facing face) to drain liquid to or supply liquid from the central outlet port. The meaning of "internal" is that it concerns the bottom wall facing the internal space of the vessel. Preferably, the bottom wall is sanitary, e.g. has a, preferably electro, polished surface, preferably mirror polished. To offer the best possible sanitary design the bottom wall is provided in high grade stainless steel, e.g. one of: 1.4403, 1.4404, 1.4435, 1.4539, 1.4462, 304(L) 316(L), 904(L), Duplex.

Each long straight groove debouching at the central outlet port extends radially outward from the central outlet port to the outer circumference of the vessel circumferential wall and a short straight groove branches from each long groove at a location between the opposite longitudinal ends of the long groove, extends towards and makes a sharp angle of at least degrees with the long groove and ends at its distal end at a radial distance from the location where the radial outer end ends and also is spaced from an adjacent long or short groove. Each long groove is branched one or more times. It could be said that the pattern of grooves resembles a leaf grain. Adjacent long grooves make a mutual angle between 15 or 20 and or 30 degrees, e.g. 22.5 degrees. The number of long grooves is between 10 or 12 and 20 or 22, e.g. 14, 15, 16, 17 or 18. A short groove branches from the long groove between 30 or 40 or 45 and 55 or 60 or 70% the long groove length, e.g. 50%. A short groove and corresponding long groove make a mutual angle between 15 or 20 and 25 or 30 degrees, e.g. 22.5 degrees. A short groove has its distal end at equal distance to its associated long groove and the adjacent long groove. In the space between two adjacent long grooves only a single short groove or short grooves of a single long groove extend. All long grooves have their short groove at the same side, as viewed in tangential direction (in other words: clockwise). The pattern of long and short grooves has a symmetry, e.g. a rotational symmetry of order at least 8 or twelve, e.g. 14, 15, 16, 17 or 18. The length of the short groove is at least or 10% and maximum 60 or 70 or 80% of the long groove length, e.g. 50%.

In particular there are provided long grooves and short grooves branching from the long grooves. Preferably the long and/or short grooves are straight, however could be non-straight, e.g. curved, angled, serpentine. In stead of a long groove and branching short groove a bifurcated groove is feasible, e.g. having branches of equal or unequal length. A short groove could be branched or bifurcated.

Alternatively or additionally, to enhance the operation of the vessel, the suspension of the mixer stirrer shaft (in here also called "drive shaft") is improved, yielding one or more of: enables adherence to aseptic practices by continuous shaft washing; enables shaft stabilization (e.g. axial and/or rotational movements of the shaft); enables cooling and/or lubrication of wear components (e.g. slider bearing cooling/lubrication) and thus service life extension; minimize load and wear on the shaft and the seals (e.g. concentric alignment provides even load distribution); minimizes the risk of precipitation of contaminants into the vessel (e.g. through seal maintenance); allows high circumferential speed, high pressure and extreme temperatures; provides a sanitary boundary between the inside and the outside of the vessel.

The drive shaft is part of the mixer and carries at low level mixing blades (also called "vanes"). The drive shaft is preferably located at the axial vessel centre. Preferably, the upper longitudinal end of the drive shaft is outside the vessel and/or attached to a drive means, e.g. electric motor, to bring the drive shaft, and thus the associated mixing blades, in rotation to stir the liquid inside the vessel. The drive shaft projects through the vessel top plate.

The vessel top plate is preferably provided with one or more of: one or more CIP (Cleaning In Place) ports; one or more liquid supply ports; a measuring equipment port; a handway; a window or port to view the vessel contents. The vessel, e.g. the top plate, is preferably provided with a vent port, preferably with filter, to allow gas/air in and out the vessel, e.g. when the mixer displaces between high and low level.

The invented suspension (also called "mechanical seal") with, e.g. continuous, washing function is a system that is mounted on top of the vessel, e.g. a stirrer mixing vessel.

The suspension comprises a means, e.g. bellows, that provides a, preferably axially, expandable housing for the drive shaft part that is displaced between above and below the top plate while changing between the high and low position; and/or an internal hollow space through which a length part, e.g. of at least 10 or 20 or 50 and/or less than 500 millimetre, of the drive shaft extends. The internal hollow space is at the radial outer side delimited by suspension walls. These suspension walls keep a distance, preferably of at least 0.1 or 1 millimetre (providing a gap), to and face the outer surface of the length part of the drive shaft inside the internal hollow space. The design is such that the length part of the drive shaft is accommodated inside the internal hollow space with a play, provided by the gap between the suspension walls and the drive shaft. The gap preferably extends circumferentially and/or axially relative to the drive shaft. The internal space is sealed relative to the environment by sealing means (e.g. located at the opposite longitudinal ends of the drive shaft length part inside the internal space and in sealing engagement with the radial external surface of said drive shaft) and is in fluid connection with an inlet channel and an outlet channel. In this manner the gap can be flown through by a liquid, flowing from the inlet channel to the outlet channel wherein the gap, completely filled with liquid, provides a liquid sleeve circumferentially and axially around the drive shaft, wetting and/or washing it.

Preferably the gap is interrupted locally by local projections (e.g. provided by grooves or ribs) from the suspension walls that project, e.g. radially, towards the drive shaft, bridging the gap, and provide a radial bearing/suspension, e.g. slide bearing, to the drive shaft. Such local projections are preferably distributed, e.g. like a spiral, circumferentially and/or axially around/along the drive shaft with a mutual spacing for sufficient stable radial suspension, preferably tilt free, and sufficient wetting and/or washing of the drive shaft external surface. Preferably the inlet channel and outlet channel are provided at an axial distance of at least 10 or 20 or 50 millimetre, e.g. each located adjacent a relevant longitudinal end of the drive shaft length part inside the internal hollow space.

Preferably, the suspension comprises one or more of the following: a bearing, e.g. a slide bearing, in suspension engagement with the drive shaft and that is e.g. sandwiched axially between two seals that are in sealing engagement with the radially outer surface of the drive shaft and seal against media (e.g. liquid) e.g. abrasive media and/or aggressive media; circumferential fluid channels; ribs; concentric alignment of the stirrer shaft through the centre of the suspension is obtained by proper means; ribs, e.g. keyways, provide concentric alignment in the axial direction of movement (i.e. up and down) and/or alignment in the radial direction of movement (i.e. rotation); fluid channels to direct the (wash-)fluid flow through the suspension from inlet to outlet (e.g. for the drainage of contaminants that are adhere to the shaft) and/or to provide cooling for the slider bearing (increasing service life); fluid channels are situated at the bottom and top of the suspension and/or in between the ribs to wash one or more of the stirrer shaft, slide bearing and seals (e.g. O-rings); axial fluid channels, directing the (wash-)fluid flow upwards (e.g. from inlet to outlet); radial fluid channels, providing circumferential direction to the (wash-)fluid flow; the drive shaft is axially suspended by the drive means and/or the supporting frame of the vessel; by lifting means of the vessel, the complete mixer can take a low position and a high position; a means, e.g. bellows, provides a, preferably axially, expandable protective housing for the drive shaft part that is displaced between above and below the top plate while changing between the high and low position; the length part of the drive shaft inside the suspension is embedded by a sleeve of wash liquid contained within a gap between the suspension and the drive shaft; the wash liquid is forced by axial and radial internal grooves at the surfaces of the mixer suspension facing the drive shaft, to flow in radial and axial direction across the drive shaft surface; the drive shaft surface of a length part of the drive shaft, accommodated inside the suspension, is thoroughly wetted and flooded all around by the advancing wash liquid.

Special requirements of any application of mechanical equipment in a pharmaceutical production environment is the "sanitary design" of such solution. Accepted sanitary design solutions minimize chances for microbial growth "by design" and offer effective clean-ability for all areas that could create a danger for microbial growth. Materials that are applied need to be protected or resistant to corrosion, aggressive liquids and should by-design minimize the application of any kind of external add-on which can and will create a conflict with respect to a risk of microbial growth. A sanitary solution is e.g. a, preferably electro, polished surface, preferably mirror polished. To offer the best possible sanitary design such surface is provided in high grade stainless steel, e.g. one of: 1.4403, 1.4404, 1.4435, 1.4539, 1.4462, 304(L) 316(L), 904(L), Duplex.

Preferably the central outlet port is provided with a valve means to selectively open and close this port. Preferably, the bottom wall is provided with a further, eccentrically located, port (also called "satellite port") which could also be provided with a valve means to selectively open and close this port.

NON-LIMITING EXAMPLES

Figures 2, 3:
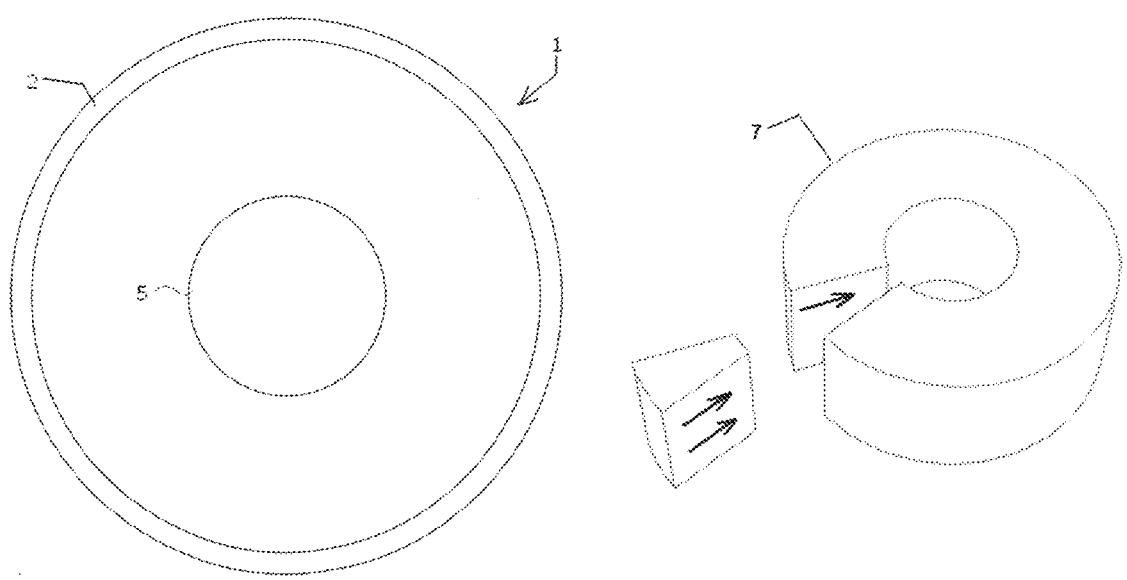
Figure 4:
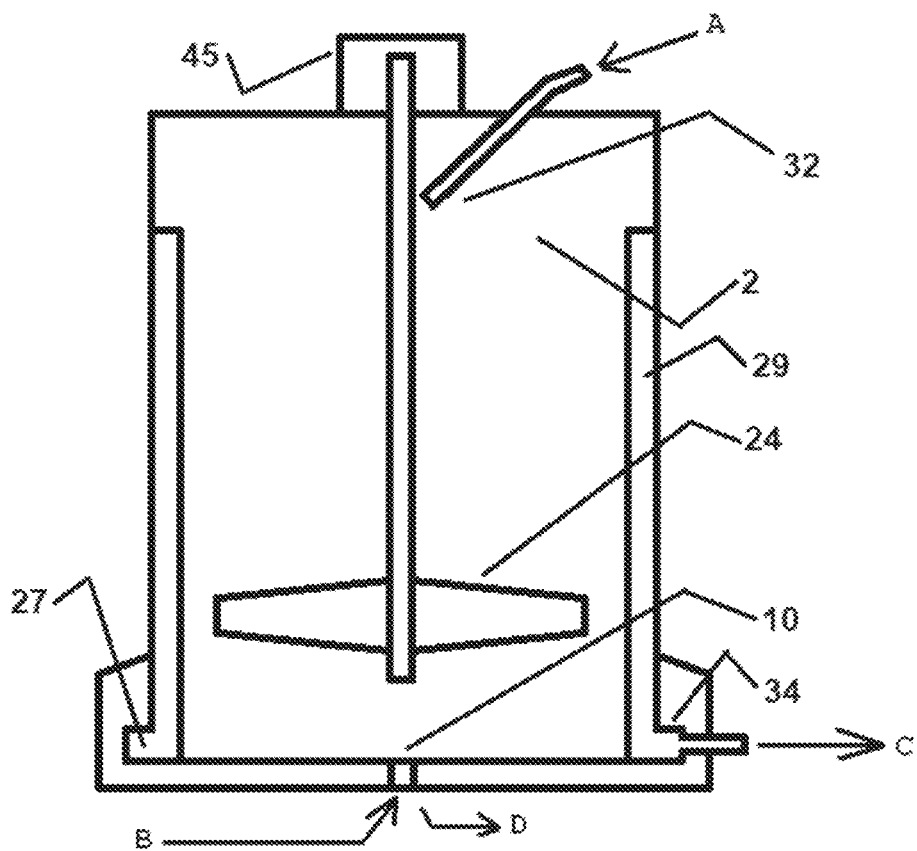
Figure 5:
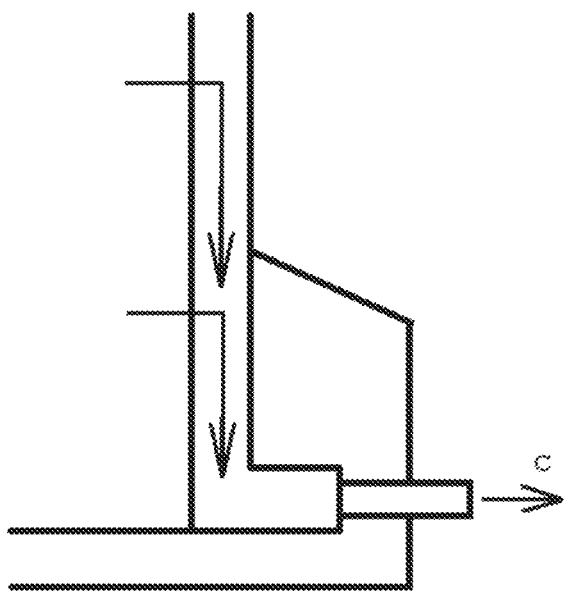
Figure 6:
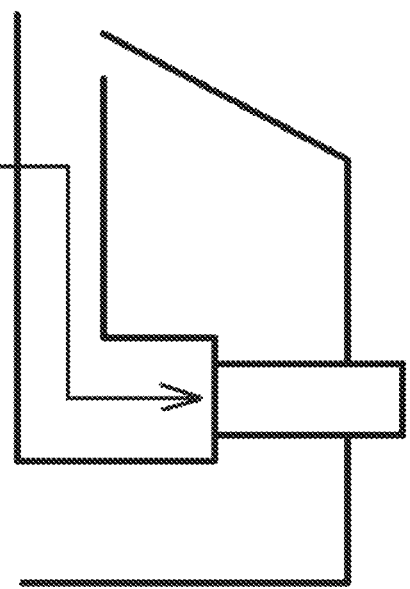
Figure 7:
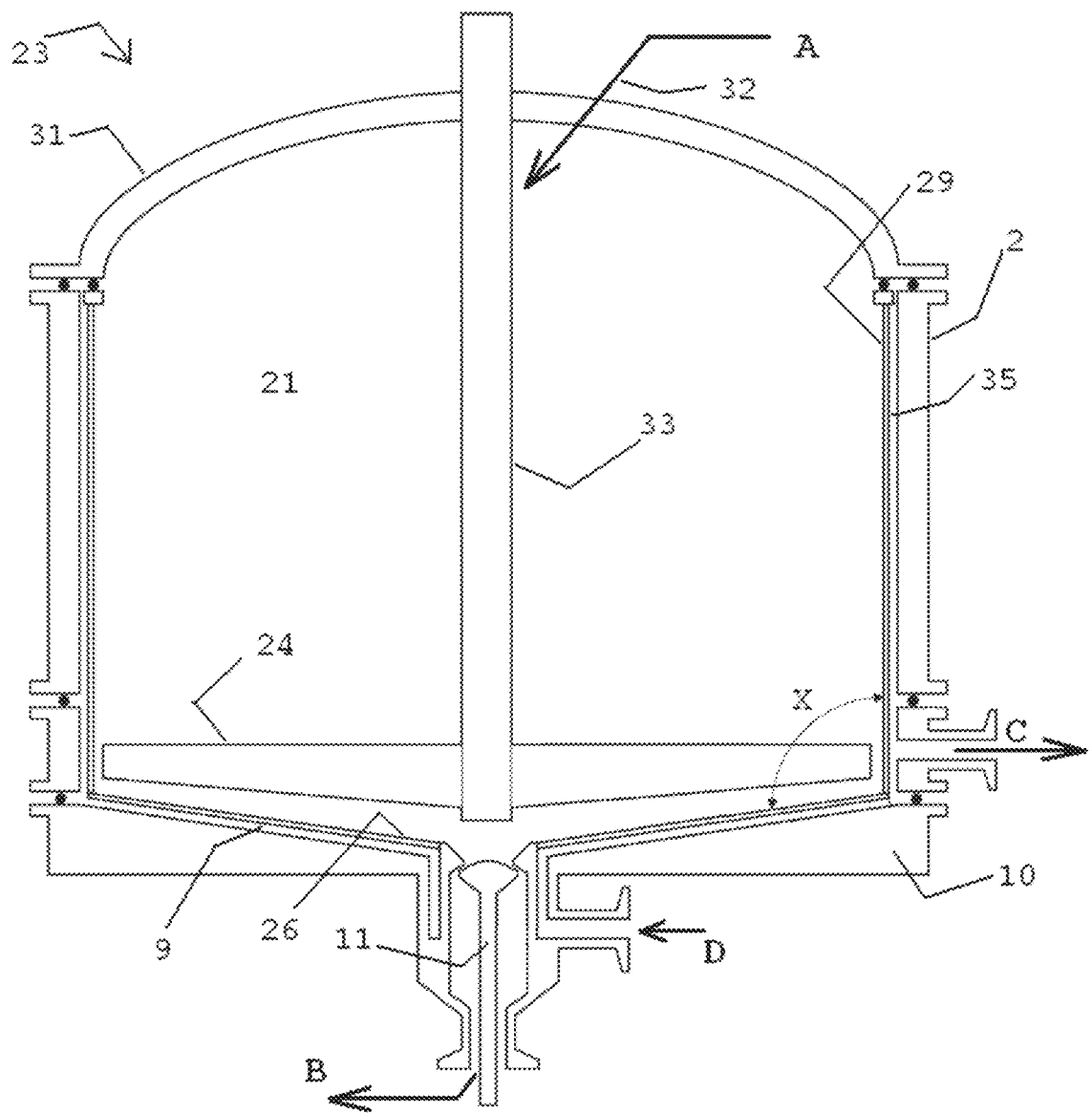
Figure 8:
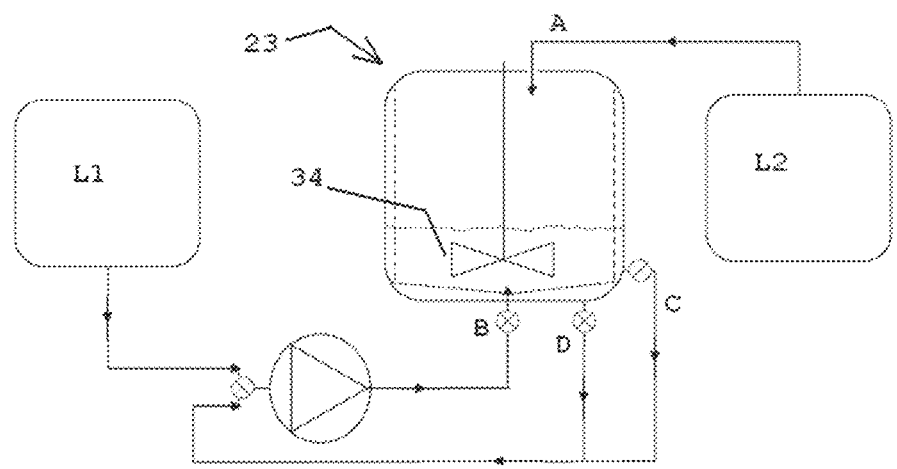
Figure 9:
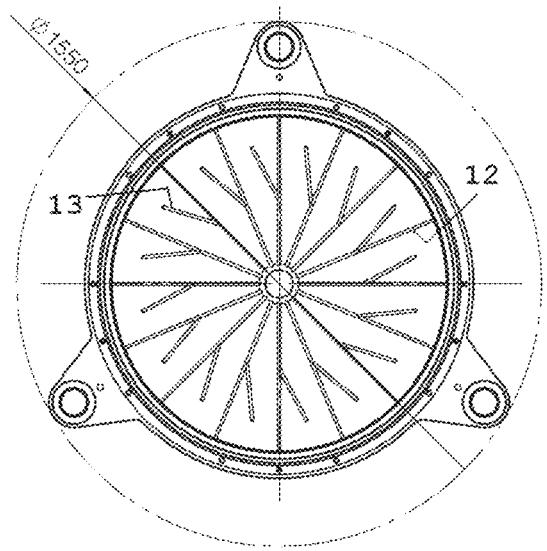
Figure 10:
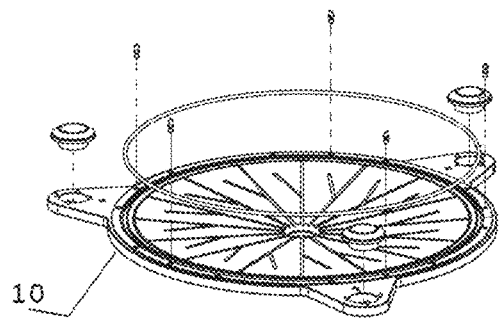
Figure 11:
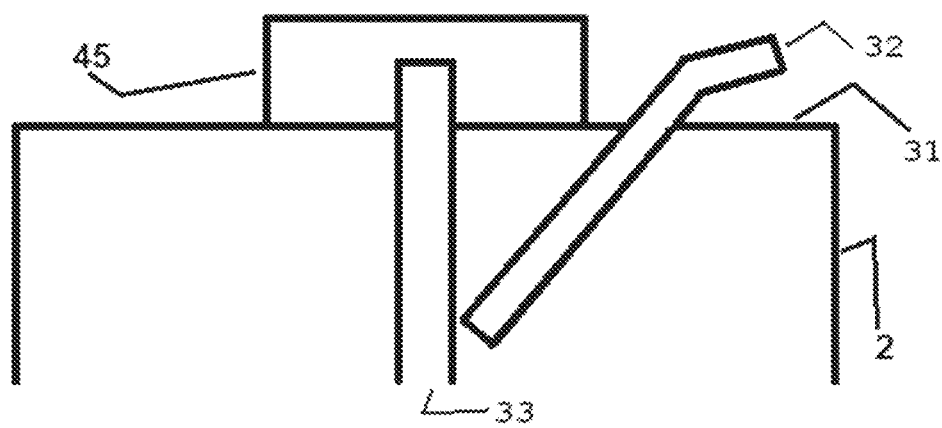
Figure 12:
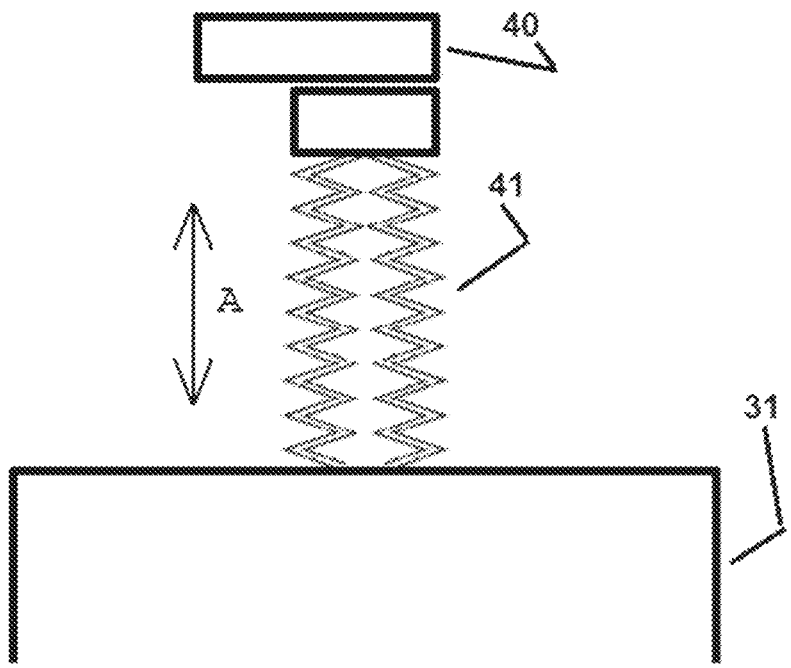

The accompanying drawings, which are incorporated and form a part of the specification, illustrate an embodiment of the invention and, together with the description, serve to explain the principles of the invention. Shown is in:

FIG. 1 an example of a chromatography column of radial type in sectional side view;

FIG. 2 the column of FIG. 1 in top view;

FIG. 3 a perspective view of a torus shaped filter bed;

FIG. 4 a sectional side view of an example of the preparation vessel;

FIG. 5-6 a detail of FIG. 4 at a larger scale;

FIG. 7 an alternative to the FIG. 4 vessel;

FIG. 8 a possible application of the vessel;

FIG. 9-10 the vessel bottom plate in top and perspective view, respectively;

FIG. 11 the top part of the vessel in perspective view;

FIG. 12 a picture of the top part of the vessel during operation; and

FIG. 13 a detail in sectional side view of a component at the top part of the vessel.

The following reference numbers are used: column 1; cylindrical housing wall 2; axial housing end plate 3; seal 4; liquid inlet 5; liquid outlet 6; packed bed 7; inner flow channel 8; outer flow channel 14; core 15; inner frit 16; outer frit 17; axial bed end plate 18; distribution space 19; collector space 20; outflow channel 21; liquid outlet 22; bed height H; outer frit radius R1; inner frit radius R2; axial direction arrow A; vessel top plate 31; inlet tube 32; drive shaft 33 of the mixing vanes 24. The radial direction is perpendicular to the axial direction.

The liquid chromatography column shown in FIG. 1 comprises: a housing, of cylindrical shape, defining a chamber therein and including a removable axial end plate 3 of circular shape; a first (outer) and second (inner) porous frits 16, 17 or membranes of cylindrical shape; a bed 7 or packing of particulate chromatographic separation material positioned intermediate said porous frits; optionally an axially extending core 15. The axially extending cylindrical external housing wall 2, first 17 and second 16 frit and core 15 are coaxial.

The torus shaped packed bed 7 allows the radial flow (viz. the arrows in FIG. 2) of process liquid through the column.

FIG. 4-13 elaborate the preparation vessel. Above the top wall 31 a drive motor 40 is present from which a drive shaft 33 extends vertically downward towards mixing vanes 24 at the bottom of the vessel 23, to mix the vessel contents. Below the mixing vanes 24 the bottom filter plate 26 is present just above the vessel bottom wall 10. FIG. 4 shows: liquid is supplied from the top (arrow A) and bottom (arrow B). Liquid from the vessel upper internal storage space is drained as follows: after downward passage through the bottom filter (arrow D) or after sideways passage through the vertical filter (arrow C). An alternative for the vessel upper internal storage space: extraction of processed gel (opposite arrow B) and liquid supply through the bottom filter (opposite arrow D), e.g. for "floating bed" draining.

FIG. 7 slightly differs from FIG. 4 and illustrates the mutual location of the vertical filter 29, bottom filter 26, bottom particle draining port (arrow B), vessel lower internal storage space 9, vessel upper internal storage space 21, vessel bottom wall 10, vessel circumferential (in this case cylindrical) wall 2, vertical draining port (arrow C), bottom draining port (arrow D), mixing blades 24, seal 11, vertical collection space 35.

FIG. 5-6 illustrate the flow sideways through the vertical filter 29 and into the flow gap 35, subsequently within the flow gap 35 downwards towards and into the collection channel 34 at the lower edge of the vertical filter 29 and subsequently from the collection channel sideways through the outlet (arrow C).

FIG. 8 shows the vessel 23 of FIG. 7 during cleaning of gel. The gel is supplied from container L2, cleaning liquid is supplied from container L1. Liquid is recirculated (lines C+D) and finally dispensed with by switching the valves in a different position.

FIG. 9-10 show the vessel bottom wall 10, in the shape of a funnel or reversed dome, having its lowest point at the axial centre of the vessel (or: the centre of the vessel bottom wall, seen in top view) and the central outlet port is located at the axial centre and crosses the bottom plate 10.

FIG. 9-10 show the inventive pattern of grooves in the top face (i.e. the to the inner space of the vessel facing face) of the vessel bottom wall (also called: bottom plate) to drain liquid to the central outlet port. Each long straight groove 12 debouching at the central outlet port extends radially outward from the central outlet port to the outer circumference of the vessel circumferential wall and a short straight groove 13 branches from each long groove at a location between the opposite longitudinal ends of the long groove, extends towards and makes a sharp angle of at least 10 degrees with the long groove and ends at its distal end at a radial distance from the location where the radial outer end ends and also is spaced from an adjacent long or short groove. Thus, each long groove is branched once. It could be said that the pattern of grooves resembles a leaf grain. Adjacent long grooves make a mutual angle. The number of long grooves is 16. A short groove branches from the long groove at 50% the long groove length. A short groove and corresponding long groove make a mutual angle of 22.5 degrees. A short groove has its distal end at equal distance to its associated long groove and the adjacent long groove. In the space between two adjacent long grooves only a single short groove extends. All long grooves have their short groove at the same side, as viewed in tangential direction (in other words: clockwise). The pattern of long and short grooves has a symmetry, e.g. a rotational symmetry of order 16.

FIG. 11 shows the top plate 31 that carries the inlet tube 32. The nozzle of the inlet tube 32 has an inclination of 40 degrees relative to the vertical and faces and is located 10 millimetre from the drive shaft 33 such that it ejects the liquid against the vertically oriented drive shaft 33.

FIG. 12 shows the top plate 31 that carries the drive motor and associated stirrer shaft 33 and mixing vanes 24 of the mixer. By lifting means of the vessel 23, the complete mixer can take a low position (vanes at short distance above the bottom sieve 29) and a high position (as shown; vanes 24 above the maximum vessel fill level). The bellows 41 provides an expandable housing for the drive shaft part that is displaced between above and below the top plate 31 while changing between the high and low position.

FIG. 13 shows the inventive suspension showing that the length part of the drive shaft inside the suspension 45 is embedded by a sleeve of wash liquid contained within a gap 44 between the suspension and the drive shaft 33. The flow of wash liquid from the inlet 42 to the outlet 43 is such that the wash liquid is forced by axial and radial internal grooves at the surfaces of the mixer suspension 45 facing the drive shaft, to flow in radial and axial direction across the drive shaft surface. In this manner the drive shaft surface of a length part of the drive shaft, accommodated inside the suspension, is thoroughly wetted and flooded all around by the advancing wash liquid. There are spaces around the drive shaft inside the suspension 45 that become filled with wash liquid.

The measures disclosed herein can be taken together individually in any other conceivable combination and permutation to provide an alternative to the invention. Included are also technical equivalents and genuses or generalizations of the revealed measures. A measure of an example is also generally applicable within the scope of the invention. A measure disclosed herein, for example of an example, can be readily generalized for inclusion in a general definition of the invention, for example to be found in a patent claim.

The invention claimed is:

1. A packed bed gel material cleaning vessel, comprising:
an internal processing volume, to contain the gel, which volume is delimited by a circumferential, axially extending, upright vessel wall (during normal operation of the vessel) at both axial ends sealed by a top vessel wall and an opposite bottom vessel wall,
wherein the internal processing volume is more than 10 litre,
wherein sensors of the vessel monitor the filling level of the vessel, and
wherein the vessel is "sanitary" and all surfaces delimiting the spaces that contain gel or liquid flowing to or from the gel are mirror polished in stainless steel,
the vessel further comprising
a bottom filter extends closely above the vessel bottom wall, such that liquid internal of the vessel can only enter the space internal of the vessel at the opposite side of the bottom filter by passing through the bottom filter;
a lower vessel volume under the bottom filter, in which the liquid that has downwardly passed through the bottom filter is collected internally of the vessel above the bottom vessel wall and below the bottom filter;
a separate bottom particle draining port in the axial centre of said bottom filter, for draining of the upper vessel volume (above the bottom filter and containing the gel) from the vessel to the outside through the vessel bottom wall; this bottom particle draining port is sealed from the lower vessel volume below the bottom filter and is in fluid communication with the upper vessel volume above the bottom filter, via a draining pipe sealingly penetrating the bottom filter and the vessel bottom wall;
the external access to and from the lower vessel volume below the bottom filter is provided by a bottom draining port and is sealed from the external access to and from the upper vessel volume via the bottom particle draining port; thus liquid free of gel particles and thus able to pass the bottom filter can be extracted from or added to the upper vessel volume, into respectively from the lower vessel volume via the bottom filter and the bottom draining port (arrow D) while independent or simultaneously gel can be extracted from or added to the upper vessel volume via the bottom particle draining port (arrow B);
a circumferential, axially extending, cylindrical vertical filter is provided a short radial distance from, parallel and concentrically with, the upright vessel wall, providing a torus like flow gap concentrical with the upright vessel wall;
the top edge of this vertical filter is above the maximum fill level (for the gel) of the vessel;
a vertical filter-draining port in the external wall of the vessel, at the lowest point of the vertical filter acts as liquid access to the flow gap (arrow C);
a mixer axially of the vessel, equipped with vessel internal blades near and above the vessel bottom filter, to stir the content of the upper vessel volume.

2. The vessel according to claim 1, wherein the top vessel wall is equipped with a vessel inlet tube and a handway;
a mixer shaft with a vertical drive shaft part,
wherein the vessel inlet tube is designed to deliver its liquid from above against the vertical drive shaft part of the mixer at an angle of 45 degrees relative to the vessel axial direction, debouching just above the maximum fill level and wherein the mixer shaft acts as a guide for the liquid further down into the gel.

3. The vessel according to claim 1, wherein the vessel bottom wall is provided with grooves at its upper face,
wherein the grooves are straight and designed to collect and distribute the liquid over the complete surface of the vessel bottom wall,
wherein there are provided long grooves and short grooves branching from the long grooves,
wherein each long groove debouches at a central outlet port and extends radially outward to the outer circumference of the upright vessel wall and a short groove branches from each long groove at a location between the opposite longitudinal ends of the long groove, and wherein the pattern of grooves resembles a leaf grain.

4. A method of cleaning used gel for a packed bed chromatography column by using the cleaning vessel according to claim 1, wherein the gel comprises beads having a diameter between 10 and 1100 micrometre (0.01-1.1 millimetre),
- wherein after use in the liquid chromatography separation column, the gel is taken from said column and introduced into the upper vessel volume to make it ready for re-use, wherein process liquid is added to the gel inside the vessel and the mixture of gel and process liquid in a mixed state inside the upper vessel volume is, stirred by the vessel mixer;
- during the processing of the gel, liquid is supplied to the upper vessel volume via the bottom particle draining port (arrow B), thus above the bottom filter, and via the vessel inlet tube (arrow A), and filtered liquid is, after having passed through the relevant filter, withdrawn from the lower vessel volume via the bottom draining port (arrow D) and from the flow gap between the vertical filter and the upright vessel wall via the vertical filter-draining port (arrow C).

5. Method according to claim 4, at the end of processing of the gel, the liquid supply via the bottom particle draining port (arrow B) and the vessel inlet tube (arrow A) is stopped and the gel content inside the upper vessel volume is concentrated by continuing removing filtered liquid via the bottom draining port (arrow D) and the vertical filter-draining port (arrow C).

6. Method according to claim 4, wherein "floating bed" draining is applied, wherein liquid is supplied to the upper vessel volume via the bottom filter and the bottom draining port, so flowing from the bottom draining port in the bottom wall upward through the bottom filter into the upper vessel volume (opposite arrow D); this results in a local dilution of the mixture just above the bottom filter, creating a floating bed onto which the gel mixture floats.

7. Method according to claim 6, wherein during "floating bed" draining the supplied liquid flows from the bottom draining port into and along the grooves such that the liquid is evenly distributed across the top surface of the bottom plate and subsequently passes the bottom filter, evenly distributed across the top surface of the bottom filter and thus creating a "floating bed" evenly distributed across the top surface of the bottom filter; and
- during "floating bed" draining the bottom particle draining port is opened and the "floating bed" created causes the gel to easily flow into the bottom particle draining port by gravity action, avoiding leaving particulate residue behind on the upper surface of the bottom filter facing the top vessel wall.

8. Method according to claim 4, wherein the filter surface facing the internal of the vessel is such that the gel cannot enter the cavities of the filter; this provides that the beads of the gel will always stay on top of the filter surface.

9. A packed bed gel material cleaning vessel, comprising:
- an internal processing volume, to contain the gel, which volume is delimited by a circumferential, axially extending, upright vessel wall (during normal operation of the vessel) at both axial ends sealed by a top vessel wall and an opposite bottom vessel wall,
- wherein the internal processing volume is more than 10 litre,
- wherein sensors of the vessel monitor the filling level of the vessel, and
- wherein the vessel is "sanitary" and all surfaces delimiting the spaces that contain gel or liquid flowing to or from the gel are mirror polished in stainless steel,
- the vessel further comprising
- a mixer shaft with a vertical drive shaft part,
- wherein the suspension of the mixer shaft is provided with a washing system mounted on top of the vessel, providing a gap around a part of the mixer shaft that is in fluid connection with an inlet channel and an outlet channel, such that the gap can be flown through by a liquid, flowing from the inlet channel to the outlet channel wherein the gap, completely filled with liquid, provides a liquid sleeve circumferentially and axially around the mixer drive shaft, wetting and/or washing it.

10. The vessel according to claim 9, wherein the suspension of the mixer shaft is provided with a means that provides an expandable housing for a part of the mixer shaft that is displaced between above and below the top plate while changing between the high and low position.

11. A packed bed gel material cleaning vessel, comprising:
- an internal processing volume, to contain the gel, which volume is delimited by a circumferential, axially extending, upright vessel wall (during normal operation of the vessel) at both axial ends sealed by a top vessel wall and an opposite bottom vessel wall,
- wherein the internal processing volume is more than 10 litre,
- wherein sensors of the vessel monitor the filling level of the vessel, and
- wherein the vessel is "sanitary" and all surfaces delimiting the spaces that contain gel or liquid flowing to or from the gel are mirror polished in stainless steel,
- the vessel further comprising
- a filter that comprises at least two layers of woven wires of stainless steel, directly laid on top of each other providing a united assembly, each layer has a pore size at least 20% different from the immediately adjacent layer, wherein a layer is directly exposed to the gel in the vessel.

* * * * *